G. H. CHINNOCK.
Metal-Cans for Paints, &c.
No. 139,868.
Patented June 17, 1873.
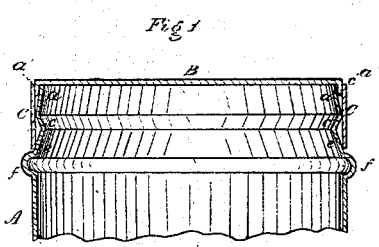
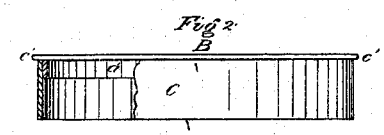
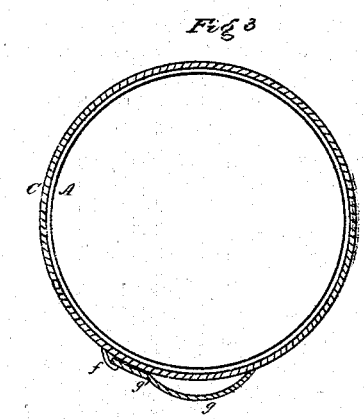
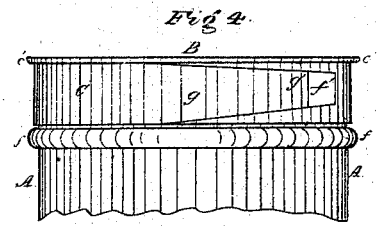
Witnesses
George J. Barry
Wm. R. Whitney
Inventor
George H. Chinnock
per
James A. Whitney
Atty

UNITED STATES PATENT OFFICE.

GEORGE H. CHINNOCK, OF BROOKLYN, NEW YORK.

IMPROVEMENT IN METAL CANS FOR PAINT, &c.

Specification forming part of Letters Patent No. 139,868, dated June 17, 1873; application filed January 30, 1873.

CASE A.

*To all whom it may concern:*

Be it known that I, GEORGE H. CHINNOCK, of Brooklyn, in the county of Kings and State of New York, have invented certain Improvements in Sheet-Metal Cans, of which the following is a specification:

This invention is designed to provide for the facile, cheap, and effective closing and opening of the sheet-metal cans used for holding, hermetically sealed, varnish, paints, condensed milk, and other substances; and it consists in certain novel means whereby the desired result is effectually secured.

Figure 1 is a vertical transverse section of a can made according to my invention. Fig. 2 is a side view and partial section of the cover constituting one portion thereof. Fig. 3 is a horizontal section taken in the line $x$ of Fig. 1. Fig. 4 is a side view.

A is the cylindrical body of the can made, preferably, of sheet-tin. The top or edge of this body is beveled or slanted inward, as at $a$, this slant forming the upper part of a circumferential rib, of which the re-entrant slant $c$ is the lower. From the base of this last is an outward slant, $e$, as shown in Fig. 1, and below this a peripherical rib, $f$. Below this last the usual plain cylindrical form of the body may be retained. The cover B is a circular disk of sheet-tin, the periphery of which is provided with the narrow downwardly-projecting flange $a'$, beyond which, in the same plane as the cover itself, projects the circumferential bead $c'$; below this last, upon the flange $a'$, is soldered the strip C. The solder used for thus attaching the strip to the cover, must be sufficiently soft and non-cohesive to part when a strain, tangent or radial to the can, is exerted longitudinally upon the strip. The strip is attached to the cover before the application of the latter to the body A, thus greatly facilitating the manufacture of the covers and their attachment in place. The bead $c'$ facilitates the guiding of the iron in soldering the strip to the cover.

When the cover is in position the flange $a$ fits upon and around the inwardly-slanting or beveled top $a$ of the body A, this slant or bevel affording space for the said flange, while the protuberant rib below fills out to the inner surface of the strip. This strip extends downward until it laps upon that portion of the slant $e$ immediately adjacent to the rib $f$. The lower edge of the strip is then soldered to the body A at the line last indicated, with solder possessed of the same essential characteristics as that used for soldering the strip to the cover. In this operation the rib $f$ serves as a guide to the soldering-iron.

In the fabrication of the cover with its attached strips C the latter has one of its ends, $g$, lapped over the other, but looped outward therefrom, as shown in Fig. 3, the extremity at $g'$ being fastened down to the continuous surface of the strip by a drop of solder at $f'$, which prevents the looped portion from being accidentally displaced. Furthermore, in order to conveniently avoid the soldering of the edges of the loop $g$ to the adjacent surfaces, which would interfere with the function hereinafter explained of the said loop, the same is made of the tapering form shown in Fig. 4.

The operation of hermetically closing the can has been hereinbefore indicated. To open the same any suitable instrument is applied to detach the soldered end of the loop $g$, which done the said end is gripped with a pair of pinchers and a forcible tensile strain applied to the strip. This by rupturing the solder causes the strip to be torn simultaneously from the cover B, and from the body A, thereby disuniting the former from the latter, and affording access to the contents of the can.

I do not claim as my invention any of the subject-matter of John Widgery's patent, dated March 12, 1872; but

What I claim as my invention is—

1. The slant or bevel $a$ at the top of the body A, arranged to receive the flange $a'$ of the cover B, while the strip C attached to the said cover is extended downward to the rib $f$, substantially as and for the purpose specified.

2. The loop $g$ of the strip C, fastened at its overlapping extremity, and arranged with reference to the cover B and body A substantially as and for the purpose specified.

3. The loop $g$ tapered as described, in combination with the strip C, arranged with reference to the cover B and body A substantially as and for the purpose specified.

GEORGE H. CHINNOCK.

Witnesses:
 GEO. H. WEBB,
 GEORGE J. BARRY.